US006113723A

United States Patent [19]

McNeil et al.

[11] Patent Number: 6,113,723

[45] Date of Patent: Sep. 5, 2000

[54] PROCESS FOR PHASED EMBOSSING AND JOINING OF PLURAL LAMINAE

[75] Inventors: Kevin Benson McNeil, Loveland, Ohio; Donn Nathan Boatman, Williamstown, Ky.

[73] Assignee: The Procter & Gamble Company, Cincinnati, Ohio

[21] Appl. No.: 08/932,854

[22] Filed: Sep. 18, 1997

[51] Int. Cl.[7] .................................. B31F 1/20; B32B 7/14

[52] U.S. Cl. ........................ 156/209; 156/291; 428/537.5

[58] Field of Search .................................... 156/209, 219, 156/291; 162/117; 428/534, 535, 537.5; 264/293

[56] References Cited

U.S. PATENT DOCUMENTS

| | | | |
|---|---|---|---|
| 3,672,949 | 6/1972 | Brown | 156/209 |
| 3,672,950 | 6/1972 | Murphy et al. | 156/209 |
| 3,673,060 | 6/1972 | Murphy et al. | 156/291 |
| 3,708,366 | 1/1973 | Donnelly | 156/209 |
| 4,320,162 | 3/1982 | Schulz | 156/209 |
| 4,326,002 | 4/1982 | Schulz . | |
| 4,487,796 | 12/1984 | Lloyd et al. . | |
| 5,747,125 | 5/1998 | Markulin | 428/34.8 |

*Primary Examiner*—Michael W. Ball
*Assistant Examiner*—Shawn A. Mitchell
*Attorney, Agent, or Firm*—Larry L. Huston; E. Kelly Linman; Jacobous C. Rasser

[57] ABSTRACT

A laminate having two or more plies. The plies are embossed, and adhesively joined together. The adhesive forms an essentially continuous network. The essentially continuous network increases the strength of adhesive, increases the strength of the laminate, and is disposed within the X-Y plane of the laminate coincident the embossments.

11 Claims, 5 Drawing Sheets

PROCESS FOR PHASED EMBOSSING AND JOINING OF PLURAL LAMINAE

FIELD OF THE INVENTION

The present invention relates to embossing plural plies of paper together to form a laminate, and more particularly to joining plies together using adhesive to improve strength and join the embossments, and the laminate made thereby.

BACKGROUND OF THE INVENTION

Multiple plies of paper have been adhesively joined together in face-to-face relationship using techniques well known in the art. A particularly suitable and commercially successful technique is found in commonly assigned U.S. Pat. No. 5,143,776, issued Sep. 1, 1992 to Givens and incorporated herein by reference.

Joining multiple plies of paper together by embossing is also well known in the art. Embossing may be accomplished by adhesively joining mated distal surfaces of protuberances to form a laminate in knob-to-knob fashion. Knob-to-knob embossing is described in commonly assigned U.S. Pat. No. 3,414,459, issued Dec. 3, 1968 to Wells and incorporated herein by reference. An example of a pattern useful with knob-to-knob embossing is disclosed in commonly assigned U.S. Pat. No. Des. 239,137, issued Mar. 9, 1976 to Appleman and incorporated herein by reference. Appleman illustrates an embossed pattern found on commercially successful paper toweling. A variant type of knob-o-knob embossing is disclosed in U.S. Pat. No. 5,443,889, issued Aug. 22, 1995 to Ruppel et al.

Yet another type of embossing is nested embossing wherein the adhesively joined embossments are mutually offset as illustrated in U.S. Pat. Nos. 3,547,723, issued Dec. 15,1970 to Gresham; 3,556,907, issued Jan. 19, 1971 to Nystrand; 3,708,366, issued Jan. 2, 1973 to Donnelly; 3,738,905, issued Jun. 12, 1973 to Thomas; 3,867,225, issued Feb. 18, 1975 to Nystrand; and 4,483,728 issued Nov. 20, 1984 to Bauernfeind.

Yet another type of embossing is found in commonly assigned U.S. Pat. No. 5,294,475, issued Mar. 15, 1994 to McNeil and incorporated herein by reference. McNeil discloses dual ply lamination wherein a multi-ply laminate having a quilted cloth-like appearance and thick caliper is generated. In dual ply lamination, the embossed sites of one ply are oriented toward, compressed against, and joined to the non-embossed regions of the other ply.

One feature common to each of the three aforementioned embossing techniques is that in each, the embossments of the paper are deflected out of the plane of the paper by the protuberances of the embossing rolls. Adhesive which joins the plies is then applied to the embossments of the paper. The plies are then joined together in face-to-face relationship with the adhesive.

These techniques permanently join the plies in face-to-face relationship. Unfortunately none generate strength within the plane of the resulting laminate.

Embossing has also been used to impart aesthetic features to the resulting laminate as disclosed in GB 2 225 745A, published Nov. 18, 1992 to Chandler; U.S. Pat. Nos. 5,620,776 issued Apr. 15, 1997 to Schulz; and 4,978,565, issued Dec. 18, 1990 to Pigneul et al. Yet another technique for imparting aesthetic features to a laminate is printing, as disclosed in U.S. Pat. No. 5,209,953, issued May 11, 1993 to Grupe et al. Unfortunately, none of these methods for imparting aesthetically pleasing features to the laminate improves its strength.

Attempts to improve strength are illustrated by U.S. Pat. Nos. 4,522,863, issued Jun. 11, 1985 to Keck et al. and 4,915,993, issued Apr. 10, 1990 to Ten Wolde. Keck et al. and Ten Wolde disclose laminates having a middle layer comprising scrim or a grid-like reinforcing fabric. Both the scrim and reinforcing fabrics are distinct, separate, continuous plies added to the center of the laminate. Unfortunately, this approach to generating strength requires an additional ply to be interposed between two outer plies. The multiple plies still must be adhesively joined together to form the desired unitary laminate.

A commercially successful attempt to impart an essentially continuous network to a single ply of paper is found in commonly assigned U.S. Pat. No. 4,637,859, issued Jan. 20, 1987 to Trokhan, which patent is incorporated herein by reference. Trokhan discloses a paper made on a deflection member having an essentially continuous network and which is imprinted against a surface such as a Yankee drying drum to form an essentially continuous pattern.

Accordingly, it is an object of this invention to provide a laminate of a plurality of plies. Furthermore, it is an object of this invention to provide a laminate having the plies embossed together. It is finally an object of this invention to provide such a laminate with a continuous grid of adhesive which imparts strength to the laminate.

SUMMARY OF THE INVENTION

This invention comprises a laminate. The laminate comprises two or more plies adhesively joined together in face-to-face relationship. The adhesive is interposed between the plies in an essentially continuous network. The plies are embossed by a plurality of embossments. The embossments are deformed normal to the plane of the laminate and preferably towards the other ply. The plies are adhesively joined together at the embossments. The embossments are coincident the essentially continuous network of adhesive.

In another embodiment, the invention comprises a process for manufacturing a laminate of two or more plies joined in face-to-face relationship. The process comprises the steps of providing at least two plies to be joined in face-to-face relationship. The plies are embossed together whereby the first face of the first ply is joined in face-to-face relationship with the first face of the second ply whereby the first ply and the second ply are joined together by a plurality of embossments. The plurality of embossments is coincident the essentially continuous network of adhesive.

DETAILED DESCRIPTION OF THE INVENTION

Figure 1:
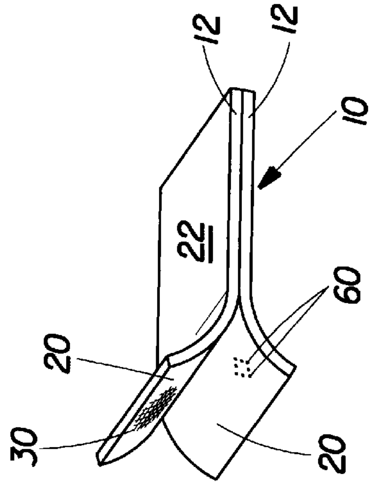
FIG. 1 is a perspective side elevational view of a laminate according to the present invention, having the plies partially separated for clarity.

Referring to FIG. 1, the present invention comprises a laminate 10. The laminate 10 comprises a plurality of two or more plies 12. Although the following discussion occurs with respect to two plies 12, one skilled in the art will understand the laminate 10 may comprise a number of plies 12 greater than two.

Each individual ply 12 of the laminate 10 has a first face 20 and a second face 22. When the plies 12 are joined together in face-to-face relationship, each ply 12 has an inner face 20 and an outer face 22. The first, or inner face 20 of each ply 12 is oriented towards the other ply 12. The second, or outer face 22 of each ply 12 is oriented away from the other ply 12.

Each ply 12 according to the present invention may be conventionally dried or through air dried. Preferably the paper comprising the ply 12 is through air dried or conventionally dried as taught in any of commonly assigned U.S. Pat. Nos. 4,191,609, issued to Trokhan; 4,514,345, issued to Johnson et al.; 4,528,239, issued to Trokhan; 4,529,480, issued to Trokhan; 5,245,025, issued to Trokhan; 5,275,700, issued to Trokhan; 5,328,565, issued to Rasch et al.; 5,334,289, issued to Trokhan; 5,364,504, issued to Smurkoski et al.; 5,527,428, issued to Trokhan et al.; 5,556,509, issued to Trokhan et al.; 5,628,876, issued to Ayers et al.; 5,629,052, issued to Trokhan et al.; and 5,637,194, issued to Ampulski et al., the disclosures of which patents are incorporated herein by reference.

Optionally, the paper according to the present invention may be foreshortened. The optional foreshortening may be accomplished by creping or by wet microcontraction. Creping and wet microcontraction are disclosed in commonly assigned U.S. Pat. Nos. 4,440,597, issued to Wells et al. and 4,191,756, issued to Sawdai, the disclosures of which patents are incorporated herein by reference.

The plies 12 are adhesively joined together as described below. A suitable adhesive 30 is aqueous based. Preferably the adhesive 30 comprises polyvinyl alcohol. Polyvinyl alcohol may be added to the adhesive 30 in the amount of 3 to 7 weight percent, and preferably about 5 weight percent.

If desired, a polyamide resin, and more particularly a cationic polyamide resin, may be added to the adhesive 30. The addition of the polyamide resin increases the wet strength of the plies 12 and increases the ply bond strength between the plies 12 of the laminate 10. A suitable polyamide resin is KYMENE, sold by the Hercules Chemical Company. If KYMENE is selected for the polyamide resin, it may be applied in the amount of about 1 to 5 weight percent, preferably about 2 to 4 weight percent, and more preferably about 2.5 weight percent.

Figure 3:
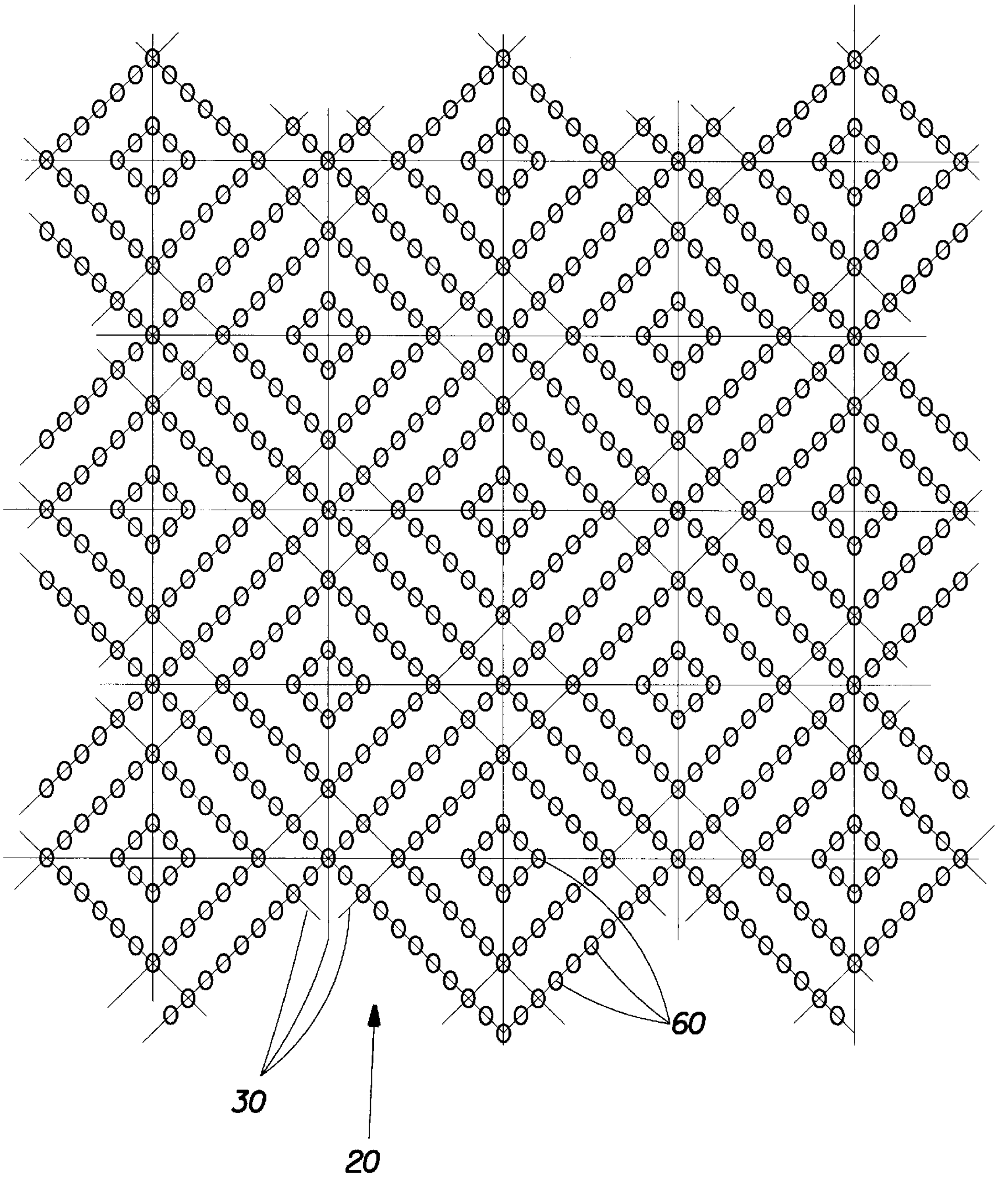
FIG. 3 is a top plan view of the inner face of one ply of a laminate according to the present invention, and having two different essentially continuous grids of adhesive.

The adhesive 30 may be applied in an essentially continuous pattern, as illustrated in FIGS. 3–4. The adhesive 30 may be applied to one or both plies 12 of the laminate 10 in an essentially continuous pattern. An essentially continuous pattern is described in the aforementioned incorporated U.S. Pat. No. 4,637,859.

Figure 2:
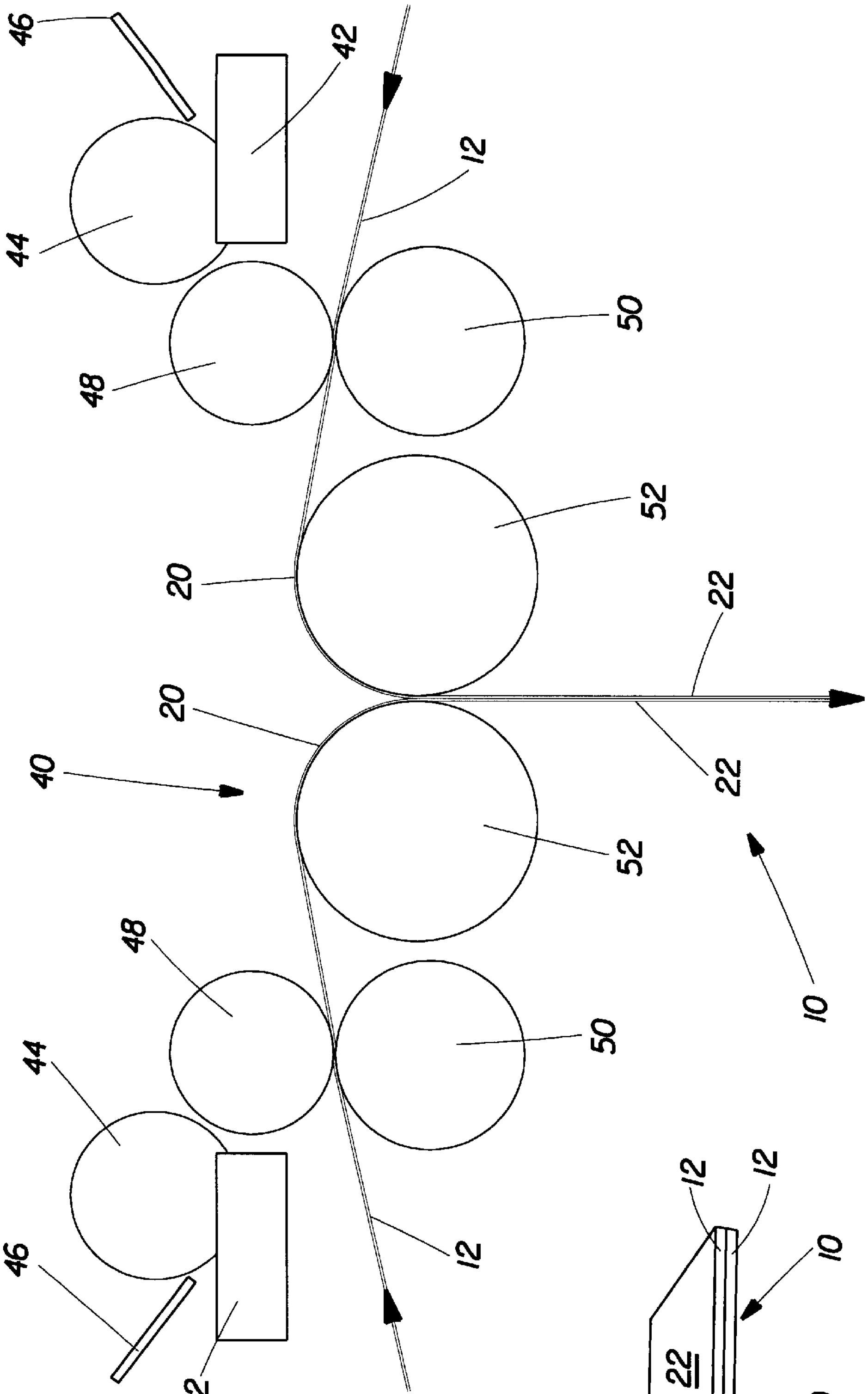
FIG. 2 is a schematic side elevational view of an apparatus which may be utilized to make the present invention.

Referring to FIG. 2, the adhesive 30 may be applied by any means known in the art, including spraying, flexographic printing, and gravure printing. If the adhesive 30 is sprayed, melt blown and spiral adhesive 30 patterns as are known in the art to be suitable patterns, as well as spraying the desired pattern from an atomizing nozzle.

For gravure printing, the apparatus 40 of FIG. 2 may be used. The apparatus 40 comprises three pairs of axially parallel adhesive rolls, in order: a gravure roll 44, an applicator roll 48, and an impression cylinder 50. The adhesive 30 is disposed in a reservoir 42 and picked up from the reservoir 42 by the gravure roll 44. Excessive adhesive 30 is metered by a doctor system 46. The adhesive 30 is transferred from the gravure roll 44 to the applicator roll 48. The impression cylinder 50 is juxtaposed with the applicator roll 48. The ply 12 passes between the applicator roll 48 and the impression cylinder 50. The adhesive 30 is preferably applied to the first and inner face 20 of the ply 12 by the applicator roll 48. The adhesive 30 may be applied in an essentially continuous pattern, resembling a grid or any other suitable pattern. A similar and mirror image apparatus 40 may be provided to print the other ply 12.

With such an apparatus 40, adhesive 30 can be printed onto each ply 12 in a predetermined pattern. Preferably the two applicator rolls 48 are phased together, even if indirectly, in order that the desired pattern of adhesive 30 of one ply 12 is registered in position with the desired pattern of the adhesive 30 of the other ply 12.

Of course, one will recognize that it is unnecessary for both applicator rolls 48 to print the entire essentially continuous network on the respective plies 12. A portion of the pattern, for example, the machine direction portion of the pattern, may be printed by the applicator roll 48 associated with the first ply 12. Another portion of the pattern, for example, the cross-machine direction portion of the pattern may be printed by the applicator roll 48 of the second ply 12. When the two plies 12 are combined, the entire grid results, forming the essentially continuous network.

After the adhesive 30 is applied to the first ply 12, the second ply 12, or both, the plies 12 pass between two pattern rolls 52 for embossing. The pattern rolls 52 may be of the type described in the aforementioned incorporated U.S. Pat. No. 5,294,475. Alternatively, the pattern rolls 52 may be of the type useful for knob-to-knob or nested embossing, as is commonly known in the art. Pattern rolls 52 suitable for knob-to-knob embossing are disclosed in the aforementioned incorporated U.S. Pat. No. 3,414,459. Pattern rolls 52 suitable for nested embossing are disclosed in U.S. Pat. No. 3,556,907.

The applicator roll 48 and pattern roll 52 may be phased together using means (not shown) well known in the art. For example, the applicator roll 48 and pattern roll 52 may be geared together. The two pattern rolls 52 may also be geared together to ensure the desired registration occurs between the two plies 12.

Alternatively, a fixed drive to an in-line phase adjuster may be utilized. In-line phase adjustment can be accomplished by an in-line sun and planetary gear system coupled between the drive motor for the system and one of the rolls to be phased as is known in the art. A suitable phase adjuster is made by Cone Drive Operations, Inc. of Traverse City, Mich.

Alternatively, phasing may be accomplished by changing the path length of the ply 12 between the two rolls desired to be phased. Path length can be changed by placing an idler roll in the web path, and adjusting the idler roll in a direction having a vector component perpendicular to the web path. All such means for providing phasing are known and do not constitute part of the present invention.

As illustrated in FIG. 3, preferably the embossments 60 comprise a non-random, repeating pattern. More preferably, embossments 60 are mutually discrete. Mutually discrete embossments 60 are separated from one another by essentially continuous non-embossed regions. A suitable and commercially successful pattern of embossments 60 comprises diamond shapes, as illustrated. It is important to recognize that while a plurality of embossments 60 taken together forms a diamond shaped pattern, each individual embossment 60 may be shaped independently of the pattern it forms in combination with other embossments 60. For example, an individual embossment 60 may be oval shaped, as illustrated, circular, square, rectangular, etc.

The laminate 10 has a machine direction and a cross-machine direction perpendicular thereto. The pattern of embossments 60 may have a primary orientation disposed at an angle relative to the machine direction and the cross machine direction. For example, the pattern illustrated in FIG. 3 has a primary orientation of any one side of the diamond disposed at a 45 degree angle, bisecting the vectors parallel to the machine and cross machine directions.

The essentially continuous pattern of adhesive 30 may be disposed in a pattern having a primary orientation which is exclusively disposed at a diagonal relative to the machine direction and the cross machine direction. This arrangement allows for a network which has a pitch between adjacent lines of adhesive 30 corresponding identically to the pitch between adjacent rows of embossments 60.

If the essentially continuous network of adhesive 30 is exclusively aligned in the machine direction and the cross machine direction, and coincident with all, or at least most, of the embossments 60, the lines of adhesive 30 would be relatively closely spaced. Lines of adhesive 30 which are spaced too closely together is undesirable because this spacing increases the cost of the resulting laminate 10, unduly reduces the absorbency of the laminate 10, and negatively impact the user's perception of the softness of the laminate 10.

If desired, an essentially continuous network of adhesive 30 having primary orientations parallel the machine and cross machine directions may be superimposed over the first essentially continuous network of adhesive 30 having a primary orientation disposed exclusively at a diagonal relative to the machine and cross machine directions. This pattern allows for two different pitches to be utilized. The first pitch corresponds to the spacing between adjacent repeating unit cells of embossments 60. The second pitch corresponds to the spacing between adjacent rows of embossments 60.

Figure 4A:
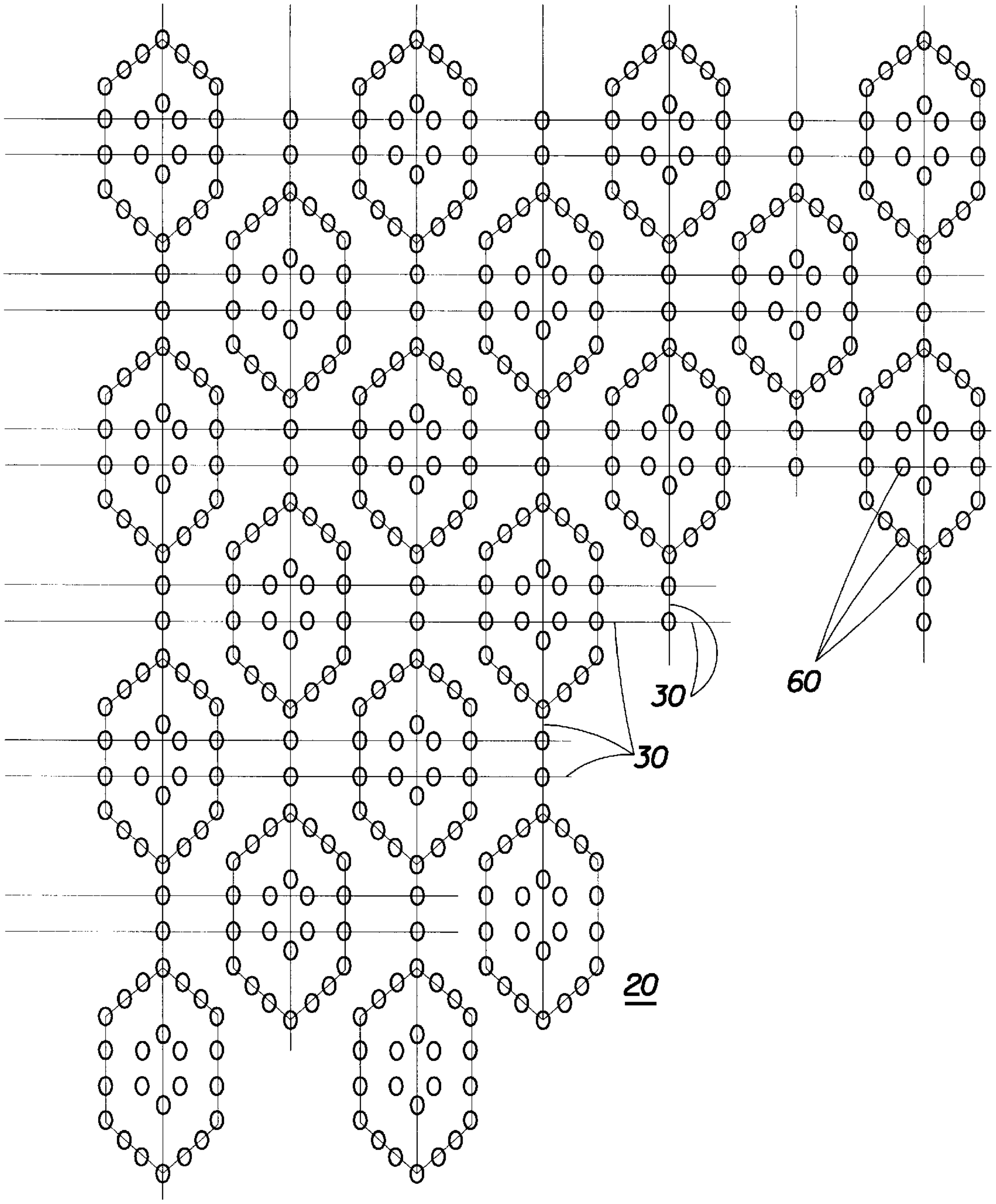
FIG. 4A is a top plan view of the inner face of one ply of a laminate according to the present invention, and having a continuous grid of adhesive superimposed upon an adhesive pattern comprising discrete closed figures.

Referring to FIG. 4A, the adhesive 30 pattern may further comprise discrete closed figures. Of course, as discussed above, the discrete closed figures may be registered with like patterns of embossments 60. This arrangement provides for ply 12 bonding the first ply 12 and second ply 12 together, without requiring an undue amount of adhesive 30 to join embossments 60 which are closely spaced. This arrangement minimizes the use of adhesive 30, thereby reducing softness and absorbency losses.

Figure 4B:
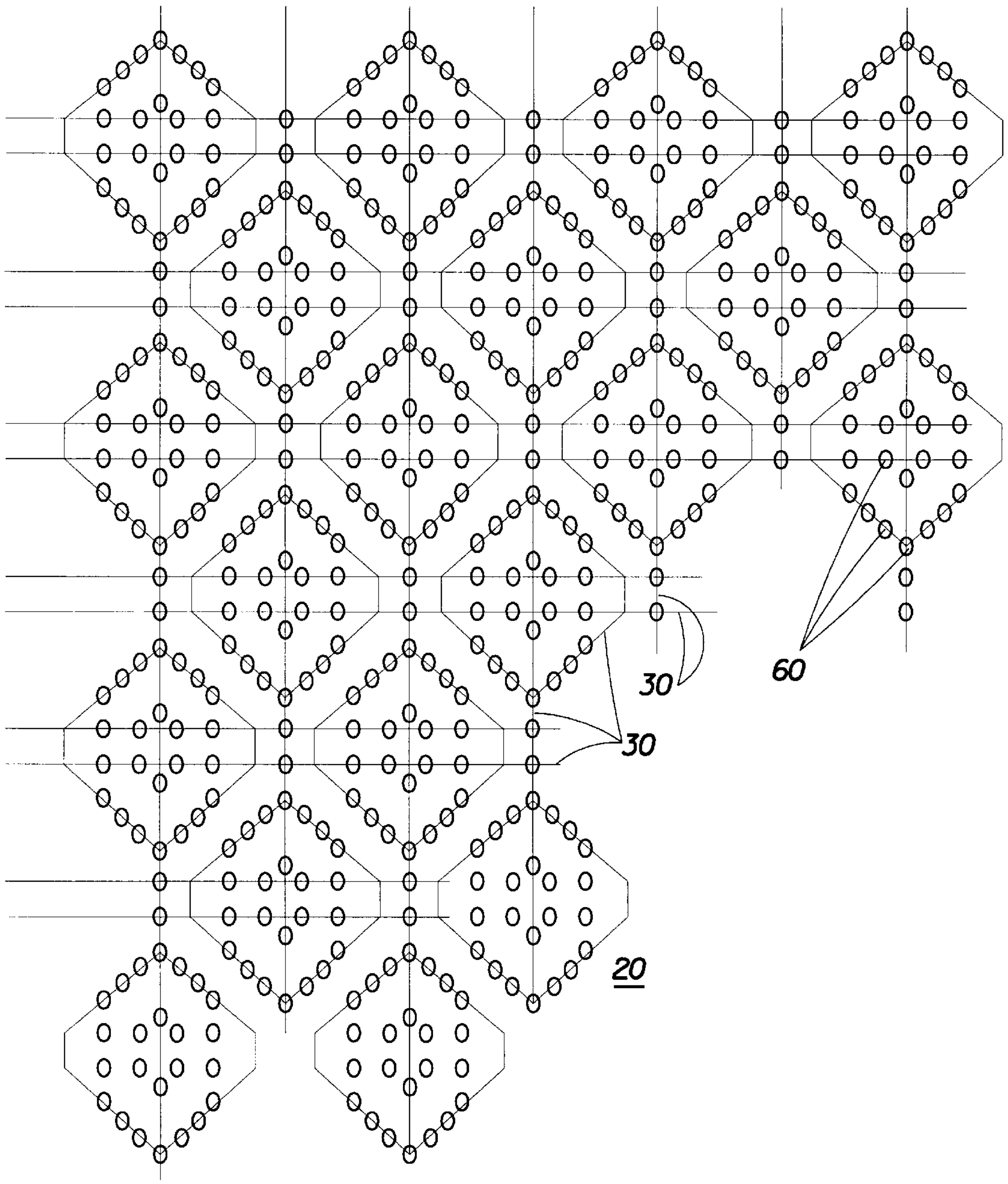
FIG. 4B is a top plan view of the inner face of one ply of the embossed pattern shown in FIG. 4A and having an adhesive pattern comprising discrete closed figures which do not follow the outline of the embossments, but instead is exaggerated to more nearly equalize the spacing between adjacent lines of adhesive.

Referring to FIG. 4B, it is to be recognized that for like patterns of embossments 60, various patterns of adhesive may be utilized. The adhesive 30 pattern in FIG. 4B is exaggerated relative to the closed figures formed by the embossments 60. Instead of identically and closely following the figure formed by the embossments 60, the adhesive 30 extends outwardly beyond such a closed figure. This arrangement provides the advantage that a more nearly equal spacing of lines of adhesive 30 is obtained. In fact, it will be recognized that for predetermined distances, the lines of adhesive 30 are mutually parallel.

Figure 4C:
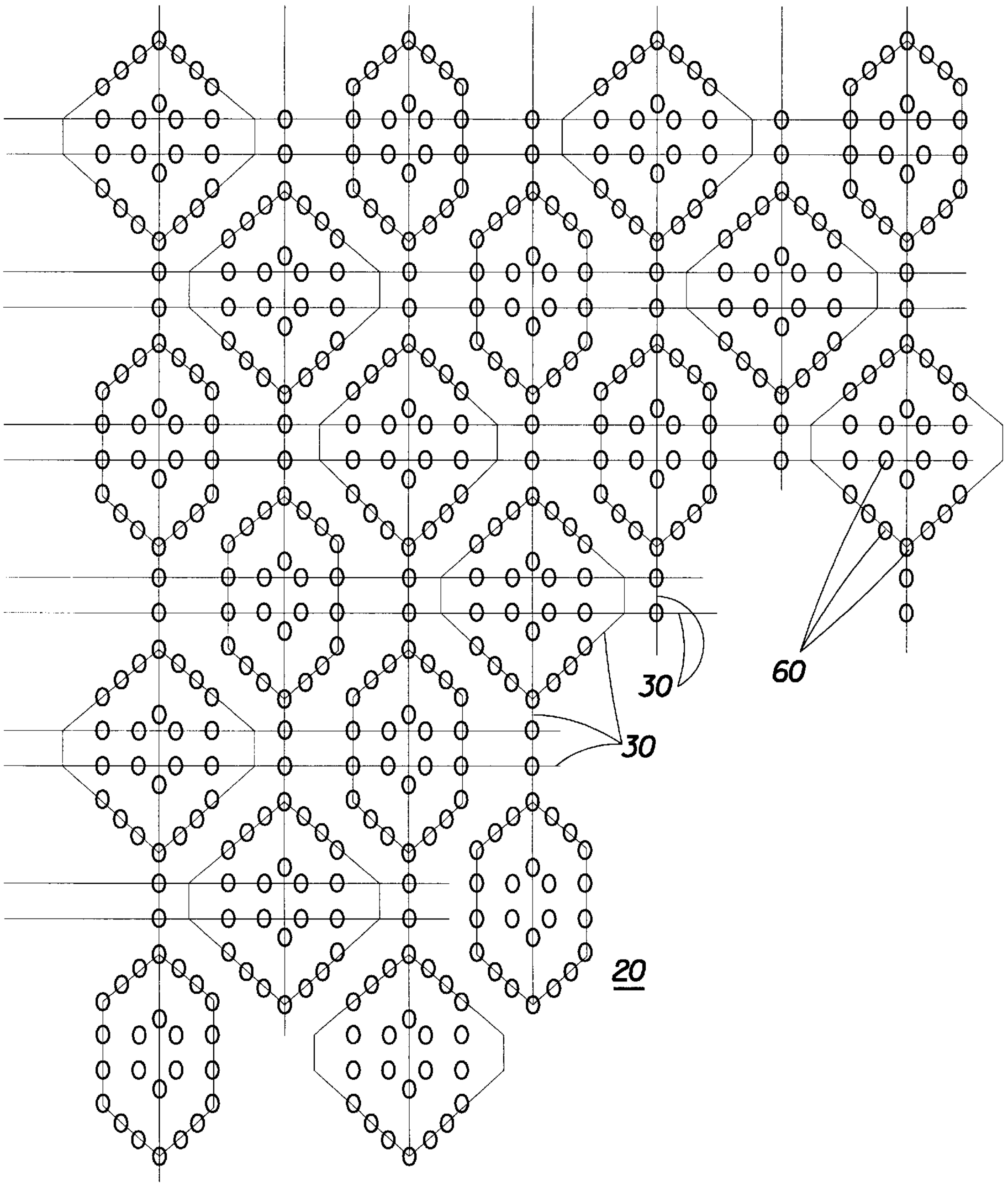
FIG. 4C is a top plan view of the inner face of a laminate having an adhesive pattern which is a hybrid of the patterns shown in FIGS. 4A and 4B.

Referring to FIG. 4C, a hybrid adhesive 30 pattern is shown for the same pattern of embossments 60 illustrated in FIGS. 4A and 4B. In the adhesive 30 pattern of FIG. 4C, alternating closed figures have an adhesive 30 pattern which identically follows the outline of the closed figures. Other closed figures have an adhesive 30 pattern which is exaggerated to equalize the spacing between adjacent lines of adhesive 30. This arrangement prophetically provides the advantage of hinge lines, for flexibility, at or between the closed figures having the circumjacent lines of adhesive 30.

It is to be recognized that there are many other combinations, permutations, and variations in the claimed invention. For example, the embossments 60 need not be limited to the oval shapes illustrated, but instead may be any shape desired. Furthermore, the patterns of embossments 60 need not be comprised of a plurality of discrete embossments 60 juxtaposed to form a pattern. Instead, the pattern may be formed by continuous embossment lines 60 as is well known in the art. All such combinations, permutations, and variations are covered by the claims below.

The laminate 10 made according to the present invention may be perforated and core wound, as is well known in the art. Suitable apparatuses for perforating, cutting, and winding the laminate 10 are well known in the art and disclosed in commonly assigned U.S. Pat. Nos. 4,687,153, issued Aug. 18, 1987 to McNeil and 5,660,350, issued Aug. 26, 1997 to Byrne et al., the disclosures of which patents are incorporated herein by reference. Alternatively, the laminate 10 according to the present invention may be cut into discrete units, as is commonly done for facial tissue, hankies, napkins, wipes, etc. An example of packaging for discrete tissues, etc. is found in commonly assigned U.S. Pat. No. 5,664,897, issued Jul. 8, 1997 to Young et al. and incorporated herein by reference.

It will be understood that the packaging and uses of the laminate 10 according to the present invention are not limited to those described above. The laminate 10 according to the present invention may be packaged, shipped, and used in a variety of suitable formats.

What is claimed is:

1. A process for manufacturing a laminate having two or more plies joined in face-to-face relationship, said process comprising the steps of:

providing two plies to be joined in face-to-face relationship, each said ply having two opposed faces, a first face and a second face;

applying a continuous network of adhesive to a first face of at least one said ply; and embossing said plies together whereby said first face of said first ply is joined in face-to-face relationship with said first face of said second ply, whereby said first ply and said second ply are joined together by a plurality of embossments, each of said embossments being coincident said continuous network of said adhesive.

2. A process according to claim 1 wherein said adhesive is applied to said first face of said first ply and said first face of said second ply.

3. A process according to claim 2 wherein said adhesive is applied from an applicator roll to said first face of said first ply and said first face of said second ply.

4. A process according to claim 1 wherein said two plies are joined together in face-to-face relationship by embossments extending said first ply towards said second ply and by embossments extending inwardly from said second ply towards said first ply, said embossments of said first ply being registered with said embossments of said second ply in a knob-to-knob pattern.

5. A process according to claim 1 wherein said two plies are joined together in face-to-face relationship by embossments extending said first ply towards said second ply, said embossments of said first ply being offset from said embossments of said second ply in a nested pattern.

6. A process according to claim 5 wherein said embossments of said first ply are joined to, and compressed against a non-embossed region of said second ply.

7. The process according to claim 1 further comprising the step of adding a polyamide resin to said adhesive.

8. A process for manufacturing a laminate having two or more plies joined in face-to-face relationship, said process comprising the steps of:

providing two plies to be joined in face-to-face relationship, each said ply having two opposed faces, a first face and a second face;

applying adhesive to each of said plies, in a predetermined pattern;

embossing said plies together whereby said first face of said first ply is joined in face-to-face relationship with said first face of said second ply, whereby said adhesive pattern disposed on said first ply and said adhesive pattern disposed on said second ply are superimposed to form a continuous network of adhesive intermediate said plies; and joining said first ply and said second ply together by a plurality of embossments, each of said embossments being coincident said continuous network of adhesive.

9. A process according to claim 8 wherein said two plies are joined together in face-to-face relationship by embossments extending inwardly from said first ply towards said second ply, said embossments of said first ply being offset from said embossments of said second ply in a nested pattern.

10. A process according to claim 8 wherein a machine direction pattern of adhesive is applied to said first face of one said ply and a cross machine direction pattern of adhesive is applied to said second ply.

11. A laminate made according to the process of claim 8.

* * * * *